(12) United States Patent
Staccione et al.

(10) Patent No.: US 6,656,991 B2
(45) Date of Patent: Dec. 2, 2003

(54) BLENDS OF FLUORINATED AND ACRYLIC ELASTOMERS

(75) Inventors: Anna Staccione, Milan (IT); Julio Abusleme, Saronno (IT)

(73) Assignee: Ausimont S.p.A., Milan (IT)

( * ) Notice: Subject to any disclaimer, the term of this patent is extended or adjusted under 35 U.S.C. 154(b) by 137 days.

(21) Appl. No.: 09/931,010

(22) Filed: Aug. 17, 2001

(65) Prior Publication Data

US 2003/0166751 A1 Sep. 4, 2003

(30) Foreign Application Priority Data

Aug. 22, 2000 (IT) .......................... MI20A1897

(51) Int. Cl.$^7$ ................................. C08K 3/18
(52) U.S. Cl. ..................... 524/430; 525/70; 525/80; 524/461; 524/462; 526/343
(58) Field of Search ............... 525/70, 80; 524/430, 524/461, 462; 526/343

(56) References Cited

U.S. PATENT DOCUMENTS

| | | | |
|---|---|---|---|
| 5,578,681 A | | 11/1996 | Tabb |
| 5,733,981 A | | 3/1998 | Coggio et al. |
| 5,902,860 A | * | 5/1999 | Abusleme et al. ....... 525/326.3 |

FOREIGN PATENT DOCUMENTS

| | | |
|---|---|---|
| EP | 0 518 073 B1 | 12/1992 |
| EP | 0 525 685 B1 | 2/1993 |
| EP | 0 525 687 B1 | 2/1993 |
| EP | 0 857 757 A1 | 8/1998 |

OTHER PUBLICATIONS

JP 11 060869, JSR Co., Ltd., Japan, Mar. 5, 1999, Synthetic Elastomers and Natural Rubber.

* cited by examiner

Primary Examiner—David W. Wu
Assistant Examiner—William Cheung
(74) Attorney, Agent, or Firm—Arent Fox Kintner Plotkin Kahn

(57) ABSTRACT

Compounds comprising a peroxide and a curable blend by peroxidic way, consisting essentially of hydrocarbon elastomers containing at least an acrylic monomer, and of unsaturated fluorinated elastomers obtained by dehydro halogenation of fluorinated VDF-based elastomers, said fluorinated elastomers having in the polymer chain at least 5% by moles of hydrogenated $C_1$ groups of the type

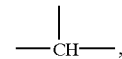

—$CH_2$— and/or —$CH_3$, the amount of unsaturated fluorinated elastomer in the elastomeric blend being comprised from 1 to 99% by weight.

12 Claims, No Drawings

BLENDS OF FLUORINATED AND ACRYLIC ELASTOMERS

The present invention relates to elastomers obtained from blends of fluorinated rubber and hydrocarbon rubber having improved mechanical properties.

Particularly, the fluorinated rubber is meant a rubber based on vinylidene fluoride (VDF) and hydrocarbon rubber is meant a hydrocarbon elastomer having at least one acrylic monomer as base monomer.

The fluorinated elastomer (FKM) performances, intended as the set of mechanical properties, compression set, thermal and chemical resistance, are notably higher than those of hydrocarbon rubbers. Such high performances of fluorinated elastomers involve however rather high costs making their use very restricted. This is due to the higher cost of the monomers and to the process technology used in their preparation.

As a consequence the users of elastomers are obliged to choose between two elastomeric families which are completely different in terms of performances and costs: fluorinated elastomers and hydrocarbon elastomers.

On one hand, there was a need to have available elastomers showing superior mechanical properties and superior properties in terms of thermal and chemical resistance compared with hydrocarbon elastomers used at present.

U.S. Pat. No. 5,902,860 describes a peroxide curable blend of hydrocarbon elastomers and fluorinated VDF-base elastomers wherein the fluororubber ranges from 5% to 75% by weight, the elastomers of said blend, that do not contain iodine and/or bromine show improved properties compared with the hydrocarbon elastomers. The Applicant has found that with these blends it is not possible to operate at high content of fluororubber since the blends are not even mouldable.

On the other hand, there was also a need to have avaible elastomers blends containing a high amount of fluororubber having a good combination of the above properties in order to cover severe applications whereby the fluororubber is over-designed.

Another important issue in the rubber industry is the shelf life of the compound which comprises the rubber and the the vulcanization ingredients mixed together. A good shelf life implies that the rheometric (viscosity) and mechanical properties of the compound do not change substantially with time. On the other way around, a compound that ages easily shows a more rapid increase with time of Mooney viscosity, changing the processing conditions with time and worsening the mechanical properties.

Another request is that the compound must not scorch.

The Applicant has now surprisingly and unexpectedly found that it is possible to obtain new elastomers, curable by peroxidic way, formed by a blend of fluoroelastomers and hydrocarbon elastomers, said blend not containing iodine and/or bromine, having improved properties.

The new elastomers, after vulcanization, show the following combination of properties:
improved mechanical and elastomeric properties,
good chemical and thermal resistance, with respect to hydrocarbon elastomers and respect to fluororubber/acrilic rubber elastomeric blends described in the prior art, in particular when the fluororubber content is the major part of the blend. Furthermore the new elastomeric compound has a long shelf life without the drawbacks above mentioned.

An object of the present invention is a compound comprising a peroxide and a curable blend consisting essentially of unsaturated-fluorinated elastomers obtained by dehydrohalogenation of fluorinated elastomers based on VDF having in the polymer chain at least 5% by moles of hydrogenated groups $C_1$ of the type

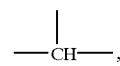

—$CH_2$— and/or —$CH_3$, and of hydrocarbon elastomers containing at least an acrylic monomer, the amount of unsaturated-fluorinated elastomer in the elastomeric blend being comprised from 1 to 99% by weight, preferably from 30 to 97% by weight, more preferably from 50 to 95% by weight, said elastomers of the blend not containing iodine and/or bromine.

The unsaturated fluoroelastomers contain —CH=CF— units and are obtained by dehydrohalogenation of fluoroelastomers based on vinylidene fluoride (VDF).

The unsaturation in the fluoroelastomer is evident by the presence of the absorbance band of the —CH=CF— unit in a FT-IR spectrum.

Examples of fluoroelastomers are VDF/hexafluoropropene (HFP) copolymers, and optionally containing tetrafluoroethylene (TFE). Other monomers can be present in the VDF-based fluoroelastomers, for example chlorotrifluoroethylene (CTFE), ethylene (E) and perfluoroalkylvinylethers with the alkyl from 1 to 4 carbon atoms, for example perfluoromethylvinylether (MVE) and perfluoropropylvinylether (PVE).

Some fluoroelastomers having the cited monomers are for example: TFE/VDF/MVE; VDF/HFP/E; E/TFE/HFP/VDF, which are well known in the art (see EP 525,685, EP 525,687 and EP 518,073 herein incorporated by reference).

As already said, the unsaturated-fluorinated elastomers of the present invention are obtained by dehydrohalogenation of fluoroelastomers characterized by containing at least 5% by moles of hydrogenated groups $C_1$ (having 1 carbon atom), preferably at least 15% by moles. The fluorinated elastomers such as VDF/HFP and VDF/HFP/TFE containing hydrogenated groups $C_1$ in amounts of at least 30% by moles are the more preferred. Said hydrocarbon groups can be determined for example by NMR analysis.

The dehydrohalogenation of the above fluoroelastomers is in brief the elimination of HX, where X is fluorine and/or chlorine, from the fluororubber backbone by a basic reagent to produce carbon-carbon unsaturation (C=C).

The dehydrohalogenation can be done: in an organic solution containing the fluoroelastomer and an organic base; in aqueous emulsion in the presence of an inorganic base such as KOH (see U.S. Pat No. 5,733,981); in solid fluororubber mixed with a base such as $Ca(OH)_2$ and in the presence of onium salts for instance quaternary ammonium or phosphonium salts, such as tetrabutylammonium hydrogensulfate (TBAHS), or quaternary aminophosphonium salts such as diphenyl-benzyl-N,N-diethyl-aminophosphonium chloride.

In the case of solid fluororubber other ingredients can be added, for example polymethylvinylether aqueous solution to promote the dehydrohalogenation.

In all cases the dehydrohalogenation rate is notably increased with temperature.

In particular the preferred dehydrohalogenation process is dehydrohalogenation of a solid fluororubber mixed with a base, preferably $Ca(OH)_2$, and an onium salt at a temperature higher than 100° C., preferably higher than 150° C.

The absorbance band of —CH=CF— unsaturation in the VDF/HFP fluoroelastomer is for instance found at about 1719 $cm^{-1}$.

The hydrocarbon elastomers of the present invention preferably do not have unsaturations, and are saturated hydrocarbon elastomers.

The Applicant has found that a later addition of dehydrohalogenating ingredients to the blend containing a saturated fluoroelastomer and a hydrocarbon elastomer leads to a compound that ages and scorches.

The acrylic monomer content in the hydrocarbon or hydrogenated elastomer is generally comprised, as percentage by moles, between 20 and 100%, preferably from 40 to 100% and more preferably from 90 to 100%. The other monomers, when present, are for example hydrocarbon monomers such as, for example, hydrogenated alpha olefins such as ethylene and propylene; vinyl esters of carboxylic acids $C_2$–$C_8$ such as vinyl acetate, vinyl propionate, vinyl 2-ethylhexanoate; olefins with other functional groups (for example allylglycidylether).

Among the most known acrylic monomers can be cited: alkyl acrylates which include $C_1$–$C_8$ alkyl esters of acrylic and methacrylic acids, among which preferred are methyl acrylate, ethyl acrylate (EA) and butyl acrylate (BA), ethylhexylacrylate; alkoxy-substituted alkyl acrylates wherein the alkoxy group has from 2 to 20 carbon atoms, such as for example 2-methoxyethylacrylate, 2-ethoxyethylacrylate, 2-(n-propoxy)propylacrylate and 2-(n-butoxy)ethylacrylate; acrylates and methacrylates containing chlorine (for example chloro-ethyl-acrylate) or other functional groups (for example glycidyl-methacrylate).

As representative examples of said hydrocarbon elastomers, the following polymers can be cited: polyethylacrylate, polybutylacrylate, polyethylbutylacrylate, polyethylbutyl acrylate glycidylmethacrylate, poly-ethylene-methylacrylate, poly-ethylene-methylmethacrylate, poly-ethylene-butylacrylate, etc.

Peroxides used in the crosslinking of the present invention can be aliphatic, cyclo-aliphatic or aromatic such as for example: 2,5-dimethyl-2,5-di(terbutylperoxy)hexane (LUPERCO® 101 XL), dicumyl peroxide, terbutylperbenzoate, 1,1-di(ter butylperoxy)butyrate.

The amount of peroxide used is comprised between 0.1 and 10 phr (parts by weight per hundred parts by weight of rubber), preferably from 0.5 to 5 phr. The peroxide, if desired, can also be supported on inert material whose weight is not included in the range of values indicated for the peroxide.

Coagents are optionally used in crosslinking systems with peroxide to improve the curing of the blend. The most preferred are polyunsaturated coagents such as: triallyl cyanurate, triallyl isocyanurate, trimethallyl isocyanurate and N,N'-m-phenylene-dimaleimide. The amount used of said coagents is comprised between 0.1 and 10 phr, preferably between 0.5 and 5 phr. If desired the coagent can be also supported on inert material.

The inert material is well known in the art and the fillers indicated below can be cited as examples of supports.

The mixing of the hydrocarbon elastomer and of the unsaturated-fluorinated elastomer can be done in a closed mixer (Banbury) or in an open mixer (two roll mill). In alternative it is possible to co-coagulate said elastomers or rubbers by mixing their respective latexes obtained through the conventional polymerization techniques in emulsion and/or microemulsion. In this case the dehydroalogenation step for the fluoroelastomer is accomplished before co-coagulation.

The cured rubber obtainable from the curable blend of the present invention shows a set of properties which are superior than those of the hydrocarbon rubbers, particularly the mechanical properties.

The compound comprising the blend of the hydrocarbon elastomer and the unsaturated fluorinated rubber and the peroxides for the crosslinking, can optionally contain other components referred to 100 phr of the elastomer blend such as: coagents for the peroxidic crosslinking; metal oxides, (e.g., PbO, ZnO, MgO), generally in amounts from 0 to 10 phr; fillers, e.g. carbon black, silica, clay or talc, PTFE, generally in amounts from 5 to 80 phr; suitable processing aids such as, for example, perfluoropolyethers with non reacting end groups, fatty acids or their alkyl esters or their salts or their amides or their mixtures, as stearic acid, alkaline metals stearates such as sodium and potassium, alkyl stearates; as stabilizers, for example antioxidants such as substituted diphenylamines (for example Naugard® 445). As suitable commercial processing aids it can be used any of those known for the processing of hydrogenated and/or fluorinated rubbers. It can be mentioned as an example Gleak® G 8205, Carnauba Wax® and Armid-O® which is the preferred.

The compounding is carried out in a closed or open mixer.

The compounds of the present invention can be used for the manufacture of O-rings, gaskets, pipes, sleeves and sheets. Furthermore, the compounds of the present invention are especially useful in the manufacture of items in the automotive field, such as for instance the production of shaft-seals.

The present invention will now be better illustrated by the following working examples, which have a merely illustrative purpose, and are not limitative of the scope of the present invention.

EXAMPLES

The tensile properties have been determined according to the ASTM D 412C method.

The compression set values have been determined on O-rings according to the ASTM D 1414 method, or on plied disks (type 2) according to ASTM D 395.

The Shore A hardness has been determined according to the ASTM D 2240 method.

The compounding has been carried out on a two roll rubber mill of dimentions: $\phi$=150 mm, L=300 mm, according to the ASTM D3182 standard.

The elastomeric blend compound is characterized on an oscillating disk rheometer ODR (ASTM D2084).

The properties of the cured product are determined on compression molded plaques (130 mm×130 mm×2 mm) at 170° C. for 20 minutes and on (internal diameter of 25.4 mm and 3.55 mm of thickness) compression molded O-rings at 170° C. for 15 minutes. The post-curing is carried out in an air-circulating oven for 8 hours and 180° C.

Example 1

The fluoroelastomer (A), characterized as in Table 1, 6 phr of Ca(OH)$_2$, 0.2 phr of a solution at 50% by weight of polymethylvynilether in water (p-MVE 50%) and 0.5 phr of tetrabutyl ammonium hydrogensulfate (TBAHS) were introduced in the two roll rubber mill of dimensions: $\phi$=150 mm, L=300 mm, and mixed at the temperature of 25°–40° C. Then, the rubber is placed in an air-circulating oven at 250° C. for 15 minutes. The rubber so obtained is named rubber (D). In the FT-IR spectrum of rubber (D) is evident an absorbance band at 1719 cm$^{-1}$.

Example 2

324 g of rubber (D) and 74 g of hydrogenated rubber (C) characterized as from Table 1 are introduced in the two roll rubber mill and mixed at the temperature of 25°–40° C. The so obtained elastomeric blend was compounded with the ingredients listed in Table 2. The ODR, mechanical properties after post-curing and mechanical properties change percent after ageing are reported in Table 2.

Example 3

381 g of rubber (D) and 19 g of hydrogenated rubber (C) of Table 1 are introduced in the two roll rubber mill and mixed at the temperature of 25°–40° C. The so obtained elastomeric blend was compounded with the ingredients shown in Table 2. The ODR, mechanical properties after post-curing, compression set and mechanical properties change percent after ageing are reported in Table 2.

Example 4 (Comparative)
Blend According to U.S. Pat No. 5,902,860

320 g of fluoroelastomer (A) and 80 g of hydrogenated rubber (C) are introduced in the two roll rubber mill and mixed at the temperature of 25°–40° C. The so obtained elastomeric blend was compounded with the ingredients shown in Table 2. The ODR is reported in Table 2.

Example 5 (Comparative)
Blend According to U.S. Pat. No. 5,902,860

380 g of rubber (A) and 20 g of hydrogenated rubber (C) are introduced in the two roll rubber mill and mixed at the temperature of 25°–40° C. The so obtained elastomeric blend was compounded with the ingredients shown in Table 2. The ODR is reported in Table 2.

Example 6

The fluoroelastomer (A), 6 phr of $Ca(OH)_2$ and 0.5 phr of diphenyl-benzyl-N,N-diethyl-aminophosphonium chloride were introduced in the two roll rubber mill of dimentions: $\phi=150$ mm, L=300 mm, and mixed at the temperature of 25°–40° C. Then, the rubber is placed in an air-circulating oven at 150° C. for 2 hours. The rubber so obtained is named rubber (E). In the FT-IR spectrum of rubber (E) is evident an absorbance band at 1719 $cm^{-1}$.

Example 7

208 g of rubber (E) and 192 g of hydrogenated rubber (B) characterized as from Table 1, are introduced in the two roll rubber mill and mixed at the temperature of 25–40° C. The so obtained elastomeric blend was compounded with the ingredients shown in Table 2. The ODR, mechanical properties after post-curing and mechanical properties change percent after ageing are reported in Table 2.

Example 8 (Comparative)
Blend According to U.S. Pat. No. 5,902,860

200 g of fluoroelastomer (A) and 200 g of hydrogenated rubber (B) are introduced in the two roll rubber mill and mixed at the temperature of 25°–40° C. The so obtained elastomeric blend was compounded with the ingredients shown in Table 2. The ODR and mechanical properties after post-curing are reported in Table 2.
Comments on the Data Shown in Table 2

The blends made according to the prior art at high content of FKM can not be molded (Examples 4 and 5 comparative).

The blends according to the invention show improved mechanical properties vs. the blends of the prior art.

Example 9

324 g of rubber (D) and 76 g of hydrogenated rubber (C) are introduced in the two roll rubber mill and mixed at the temperature of 25°–40° C. The so obtained elastomeric blend was compounded with the ingredients listed in Table 3. In said Table are given the results of aging for the Mooney compound after 1 and 20 days and for the ODR after 1, 7 and 20 days.

The mechanical properties after post-curing and compression set are also given.

Example 10 (Comparative)

This example wants to demonstrate that a later addition of dehydrohalogenating ingredients to the blend containing fluoroelastomer (A) and hydrogenated rubber (C) does not lead to the results as with the blend of the invention.

320 g of fluoroelastomer (A) and 80 g of hydrogenated rubber (C) are introduced in the two roll rubber mill and mixed at the temperature of 25°–40° C. The so obtained elastomeric blend was compounded with the ingredients listed in Table 3. In said Table are given the results of aging for the Mooney compound after 1 and 20 days and for the ODR after 1, 7 and 20 days.

The mechanical properties after post-curing and compression set are also given.

Table 3 shows that the compound of Example 10 comparative scorches because the Mooney value at 121° C.: is not stable. In fact the ML minimum value is lower than ML 1+10.

Example 11

208 g of rubber (D) and 192 g of hydrogenated rubber (C) are introduced in the two roll rubber mill and mixed at the temperature of 25°–40° C. The so obtained elastomeric blend was compounded with the ingredients listed in Table 4. In said Table are given the results of aging for the ODR after 1 and 12 days and the mechanical properties after post-curing.

Example 12 (Comparative)

This example wants to demonstrate the same as Example 10 comparative.

200 g of fluoroelastomer (A) and 200 g of hydrogenated rubber (C) are introduced in the two roll rubber mill and mixed at the temperature of 25°–40° C. The so obtained elastomeric blend was compounded with the ingredients listed in Table 4. In said Table are given the results of aging for the ODR after 1 and 12 days and the mechanical properties after post-curing.

Tables 3 and 4 demonstrate that the shelf life of the compound of the invention is much higher than those of the comparative Examples. Also the mechanical properties are better.

TABLE 1

| RUBBER | COMPOSITION | (% by moles) | $ML_{(1+10)}$ 121° C. | Hydrogenated $C_1$ groups (% by moles) |
|---|---|---|---|---|
| Fluoroelastomer: | | | | |
| A | VDF/HFP | 80/20 | 52 | 36 |
| Hydrogenated rubbers: | | | | |
| B | EA/BA | 55/45 | 43 | — |
| C | EA/BA | 65/35 | 42 | — |

TABLE 2

| Examples | | 2 | 3 | 4 comp | 5 comp | 7 | 8 comp |
|---|---|---|---|---|---|---|---|
| Formulation | | | | | | | |
| Hydrogenated rubber B | wt % | — | — | — | — | 48 | 50 |
| Hydrogenated rubber C | " | 19 | 4.7 | 20 | 5 | | — |
| Fluoroelastomer A | " | — | — | 80 | 95 | | 50 |
| Rubber D (ref. ex. 1) | " | 81 | 95.3 | — | — | | — |
| Rubber E (ref. ex. 6) | " | — | — | — | — | 52 | — |
| Luperco ® 101 XL (1) | phr | 3 | 3 | 3 | 4 | 4 | 4 |
| TAIC ® drymix (2) | " | 4 | 4 | 4 | 4 | 4 | 4 |
| ZnO | " | 5 | 5 | 5 | 5 | 4 | 4 |
| Naugard ® 445 | " | 0.65 | 0.6 | 0.65 | 0.6 | 0.7 | 0.7 |
| Carbon black SRF (N772) | " | — | — | — | — | 40 | 40 |
| Carbon black MT N990 | " | 40 | 30 | 40 | 30 | — | — |
| ODR at 177° C., arc 3°, 24 min. | | | | | | | |
| ML | lbf*in | 10 | 16 | 5 | 3 | 4.9 | 3.7 |
| MH | " | 45 | 48 | 27 | 37 | 56 | 50 |
| ts2 | s | 114 | 109 | 125 | 103 | 120 | 120 |
| t'50 | " | 229 | 204 | 204 | 206 | 252 | 246 |
| t'90 | " | 509 | 424 | 390 | 366 | 498 | 462 |
| Vmax | lbf*in/s | 0.15 | 0.16 | 0.12 | 0.28 | 0.20 | 0.19 |
| Mechanical properties after post cure 180° C. × 8h | | | | | | | |
| Modulus 100% | MPa | 4 | 3.3 | * | * | 5.7 | 5.1 |
| Tensile strength | " | 8.3 | 10.8 | | | 8.6 | 6.6 |
| Elongation at break | % | 371 | 418 | | | 286 | 186 |
| Hardness Shore A | points | 66 | 65 | | | 70 | 71 |
| Mechanical properties change percent after aging at 200° C. × 70h | | | | | | | |
| Δ% Tensile strength | | 13 | 29 | | | 16 | |
| Δ% Elongation at break | | −27 | −25 | | | −44 | |
| Δ% Hardness Shore A | | 5 | 4 | | | 6 | |

(1) 2,5-dimethyl-2,5-di(terbutylperoxy)hexane 45% by weight on inert support (marketed by Atochem, Inc.).
(2) Triallylisocianurate 75% by weight on inert support (marketed by Arwick).
*It was not possible to determine the mechanical properties since it was not possible to obtain a compression molded plaque.

TABLE 3

| Examples | | 9 | | | 10 Comp | | |
|---|---|---|---|---|---|---|---|
| Formulation | | | | | | | |
| Hydrogenated rubber C | wt % | 19 | | | 20 | | |
| Fluoroelastomer A | " | — | | | 80 | | |
| Rubber D (ref. ex. 1) | " | 81 | | | — | | |
| Luperco ® 101 XL (1) | phr | 5 | | | 5 | | |
| TAIC ® drymix (2) | " | 5 | | | 5 | | |
| ZnO | " | 5 | | | 5 | | |
| Naugard ® 445 | " | 0.65 | | | 0.65 | | |
| MT N990 | " | 40 | | | 40 | | |
| TBAHS | " | — | | | 0.4 | | |
| Ca(OH)$_2$ | " | — | | | 4.8 | | |
| p-MVE 50% | " | — | | | 0.1 | | |
| days | | 1 | 7 | 20 | 1 | 7 | 20 |
| Mooney compound 121° C. | | | | | | | |
| ML (minimum value) | | 43 | | 46 | 36 | | 47 |
| ML 1 + 10 | | 43 | | 46 | 44 | | 47 |
| ODR at 177° C., arc 3°, 24 min. | | | | | | | |
| ML | lbf*in | 9.3 | 10.2 | 10.5 | 6.8 | 9.6 | 12.0 |
| MH − ML | " | 44.3 | 40.0 | 38.0 | 40.8 | 33.9 | 29.9 |
| ts2 | s | 1.57 | 1.65 | 1.62 | 1.35 | 1.52 | 1.55 |
| t'50 | " | 2.78 | 2.90 | 2.85 | 2.53 | 2.55 | 2.57 |
| t'90 | " | 4.85 | 5.08 | 5.00 | 4.87 | 4.48 | 4.45 |
| Vmax | lbf*in/s | 0.32 | 0.28 | 0.27 | 0.31 | 0.27 | 0.24 |
| Mechanical properties after post cure 180° C. × 8 h | | | | | | | |
| Modulus 100% | MPa | 5.3 | | | 5.0 | | |
| Tensile strength | " | 8.2 | | | 7.9 | | |

TABLE 3-continued

| | | | |
|---|---|---|---|
| Elongation at break | % | 274 | 327 |
| Hardness Shore A | points | 71 | 75 |
| Compression set on plied disks # 175° C. x 70 h | % | 52 | 66 |

TABLE 4

| Examples | | 11 | | 12 comp | |
|---|---|---|---|---|---|
| Formulation | | | | | |
| Hydrogenated rubber C | wt % | 48 | | 50 | |
| Fluoroelastomer A | " | | | 50 | |
| Rubber D (ref. ex. 1) | " | 52 | | | |
| Luperco ® 101 XL (1) | phr | 4 | | 4 | |
| TAIC ® drymix (2) | " | 4 | | 4 | |
| ZnO | " | 4 | | 4 | |
| Naugard ® 445 | " | 0.7 | | 0.7 | |
| MT N990 | " | 40 | | 40 | |
| TBAHS | " | — | | 0.25 | |
| Ca(OH)$_2$ | " | — | | 3 | |
| p-MVE 50% | " | — | | 0.1 | |
| days | | 1 | 12 | 1 | 12 |
| ODR at 177° C., arc 3°, 24 min. | | | | | |
| ML | lbf*in | 5.2 | 6 | 2.7 | 4 |
| MH - ML | " | 44.8 | 42 | 44.3 | 42 |
| ts2 | s | 2.07 | 2.83 | 1.98 | 2.00 |
| t'50 | " | 4.42 | 4.37 | 4.33 | 4.35 |
| t'90 | " | 9.38 | 9.43 | 9.30 | 9.45 |
| Vmax | lbf*in/s | 9.6 | 9 | 9.6 | 9 |
| Mechanical properties after post cure 180° C. x 8h | | | | | |
| Modulus 100% | MPa | 4.4 | | 4.9 | |
| Tensile strength | " | 9.0 | | 7.9 | |
| Elongation at break | % | 278 | | 288 | |
| Hardness Shore A | points | 67 | | 69 | |
| Compression set on O-ring # 175° C. x 70 h | % | 54 | | 61 | |

What is claimed is:

1. Compounds comprising a peroxide and a curable blend by peroxidic way, consisting essentially of hydrocarbon elastomers containing at least an acrylic monomer, and of unsaturated fluorinated elastomers obtained by dehydrohalogenation of fluorinated VDF-based elastomers, said fluorinated elastomers having in the polymer chain at least 5% by moles of hydrogenated C$_1$ groups of the type >CH—, —CH$_2$— and/or —CH$_3$, the amount of unsaturated fluorinated elastomer in the elastomeric blend being comprised from 1 to 99% by weight, the elastomers of the blend not containing iodine and/or bromine.

2. Compounds according to claim 1, wherein the unsaturated fluoroelastomers contain —CH═CF— units.

3. Compounds according to claim 1, wherein the fluorinated elastomers are selected from the group consisting of VDF/HFP copolymers, optionally in the presence of TFE.

4. Compounds according to claim 1, wherein in the VDF-based elastomers are present fluorinated comonomers selected from the group consisting of chlorotrifluoroethylene, ethylene, and perfluoroalkyl-vinylethers with the alkyl from 1 to 4 carbon atoms.

5. Compounds according to claim 1, wherein the fluorinated elastomers contain in the polymer at least 15% by moles of hydrogenated C$_1$ groups.

6. Compounds according to claim 5, wherein the fluorinated elastomers contain in the polymer at least 30% by moles of hydrogenated C$_1$ groups.

7. Compounds according to claim 1 wherein, the hydrocarbon elastomers are saturated hydrocarbon elastomers.

8. Compounds according to claim 1, wherein the acrylic monomer content in the hydrocarbon elastomer is between 20 and 100% by moles.

9. Compounds according to claim 1, wherein the amount of peroxide used is comprised between 0.1 and 10 phr.

10. Compounds according to claim 1, further comprising coagents for the peroxidic crosslinking in an amount comprised between 0.1 and 10 phr; optionally one or more of the following compounds:

metal oxides in amounts from 0 to 10 phr; fillers from 5 to 80 phr; processing aids; stabilizers.

11. Compounds according to claim 1, wherein the hydrocarbon and unsaturated fluorinated elastomers are co-coagulated by mixing their respective polymerization latexes.

12. Cured products obtained from the compounds according to claim 1.

* * * * *